United States Patent [19]

Okahara

[11] Patent Number: 4,942,784
[45] Date of Patent: Jul. 24, 1990

[54] TRANSMISSION CONTROL SYSTEM FOR THE AUTOMATIC TRANSMISSION OF AUTOMOTIVE VEHICLES FOR GEAR TRAIN LOCKING UPON UNINTENDED ACCELERATION

[75] Inventor: Hirofumi Okahara, Kanagawa, Japan

[73] Assignee: Nissan Motor Company, Limited, Yokohama, Japan

[21] Appl. No.: 258,529

[22] Filed: Oct. 17, 1988

[30] Foreign Application Priority Data

Oct. 15, 1987 [JP] Japan .................. 62-260545

[51] Int. Cl.⁵ ............................................. B60K 41/06
[52] U.S. Cl. ...................................... 74/866; 74/878; 364/424.1
[58] Field of Search .................. 74/878, 866, 867, 868, 74/869; 364/424.1

[56] References Cited

U.S. PATENT DOCUMENTS

| | | | |
|---|---|---|---|
| 3,727,488 | 4/1973 | Wakamatsu et al. | 74/869 X |
| 3,845,674 | 11/1974 | Hause | 74/878 |
| 4,566,355 | 1/1987 | Sugano | 74/878 X |
| 4,665,777 | 5/1987 | Kikuchi et al. | 74/866 |
| 4,688,449 | 8/1987 | Harada et al. | 74/866 X |
| 4,691,285 | 9/1987 | Takeda | 74/866 |
| 4,693,142 | 9/1987 | Kurihara et al. | 74/878 X |
| 4,726,262 | 2/1988 | Hayakawa et al. | 74/866 |

*Primary Examiner*—Dwight Diehl
*Attorney, Agent, or Firm*—Foley & Lardner, Schwartz, Jeffery, Schwaab, Mack, Blumenthal & Evans

[57] ABSTRACT

A transmission control system for automobiles having an automatic transmission comprises a hydraulic control circuit including a plurality of valves for locking a gear train itself by engaging a predetermined combination of frictional elements in the gear train upon detecting conditions which would result in sudden acceleration of the vehicle, only when the vehicle speed is lower than a predetermined value. The transmission control system of the invention reliably functions as a safety device for preventing unintended sudden acceleration of the vehicle.

10 Claims, 3 Drawing Sheets

TRANSMISSION CONTROL SYSTEM FOR THE AUTOMATIC TRANSMISSION OF AUTOMOTIVE VEHICLES FOR GEAR TRAIN LOCKING UPON UNINTENDED ACCELERATION

BACKGROUND OF THE INVENTION

1. Field of the Invention

The present invention relates generally to a control system for an automatic transmission for automotive vehicles. Specially, the invention relates to a system which, in an emergency, is capable of locking the gear train of the vehicles having an automatic transmissions, which system so as to prevent unintended sudden acceleration of the vehicle from occurring by erroneous operation at a relatively low vehicle speed of less than 10 km/hr., for example.

2. Description of the Prior Art

Conventionally, an automatic transmission includes a torque converter, an oil pump, a power train or a gear train, a hydraulic control system having a control valve, and an electronic control system.

The gear train of automatic transmission includes a plurality of frictional elements for operating so as to establish or release engagement between a set of planetary gears or between individual elements of the planetary gears. The engagement between frictional elements is established or released by hydraulic pressure provided from the control valve.

The respective range modes of the automatic transmission can be selected by manually operating a select lever adjacent to a driver seat. The setting of the select lever is transmitted through transmitting members, such as a wire cable, a rod, or a lever to the control valve with the result that the control valve is operated and outputs a line pressure.

Generally, a vehicle having such automatic transmissions will move immediately, when the select lever is changed from a non-driving position, such as neutral position (N) or parking position (P) to driving position, such as drive position (D) or reverse position (R). Therefore, switching the lever from non-driving position to driving position is preferably performed with the brake ON, and thereafter the brakes are released to allow the vehicle to accelerate gradually.

Conversely, if the control lever is operated to a drive position while the engine is under full throttle the vehicle will accelerate suddenly and violently. As a result, passengers may not only be surprised but also may be exposed to great danger.

Therefore, there have been proposed transmission control systems wherein the transmission will not go into gear if the brakes are not applied and the engine is rotating quickly.

One such transmission control system has been disclosed in the Japanese Utility Model Publication (Jikkou Showa) 62-20343. In this and other conventional transmission control systems, the shift preventing means comprises a solenoid coil and a solenoid shaft. The shift preventing means is attached on an outer member outside of the transmission assembly, such as a select lever bracket.

As set forth above, the movement of the select lever is transmitted through the transmitting members to the control valve. The transmitting members are designed to have a suitable degree of play such that the linkages can move smoothly. Therefore, even if the select lever is locked by the preventing means, the select lever move slightly from the predetermined position. Therefore, with this construction, the select lever is not perfectly locked.

In order to overcome the problems in the prior art and increase the performance of the running control systems, there has been proposed an improved running system which reliably prevents such erroneous operation of the select lever by the driver.

SUMMARY OF THE INVENTION

Therefore, it is a principle object of the present invention to provide a transmission control system for automotive vehicles having an automatic transmission, in which the gear train itself is locked against erroneous operation and in which the switching from the non-driving range position to the driving range position is reliably prevented by the lock of the gear train regardless of the position of the select lever. The transmission control system of the invention reliably functions as a safety device for preventing unanticipated sudden acceleration of the vehicle.

In order to accomplish the aforementioned and other objects, a transmission control system for vehicular automatic transmission according to the invention, comprising a plurality of gears may be selectively engaged by means of a plurality of frictional elements, such as a forward clutch, a band brake, a high-clutch, and an overrunning clutch, provided in a gear train which are engaged or released by means of a hydraulic pressure control device characterized by means for locking the gear train by engaging a predetermined combination of the frictional elements in response to a detection signal which is outputted from an electronic control unit and is indicative of conditions which could produce sudden acceleration, while the vehicle speed is slower than a predetermined value. The means comprises a first solenoid valve for activating a first spool of a first spool valve which is communicated through oil passages with the plurality of frictional elements, a second solenoid valve for activating a second spool of a second spool valve which is communicated through the oil passages to the plurality of frictional elements, a third spool valve hydraulically communicated with the overrunning clutch, a third solenoid valve for activating the third spool valve, the third solenoid valve is operated in response to the detection signal. The first and second solenoid valves are operated by an output signal from the electronic control unit. The plurality of frictional elements are selectively activated according to combination of ON and OFF operations of the first and second solenoid valves. According to the invention, the first, second and third solenoid valves simultaneously receive the detection signal when the electronic control unit detects conditions which could produce sudden acceleration while the vehicle speed is lower than a predetermined value, and in response the forward clutch, the band brake, the high-clutch, and the overrunning clutch are, respectively, engaged and as a result the gear train is locked.

The detection signal is produced by a detection means in the electronic control unit which processes various signals, such as a range position signal indicative of a position of a shift lever, a speed signal indicative of a vehicle speed, a braking detection signal indicative of a braking mode, an engine speed signal, an accelerator pedal angle signal, and a throttle opening angle signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
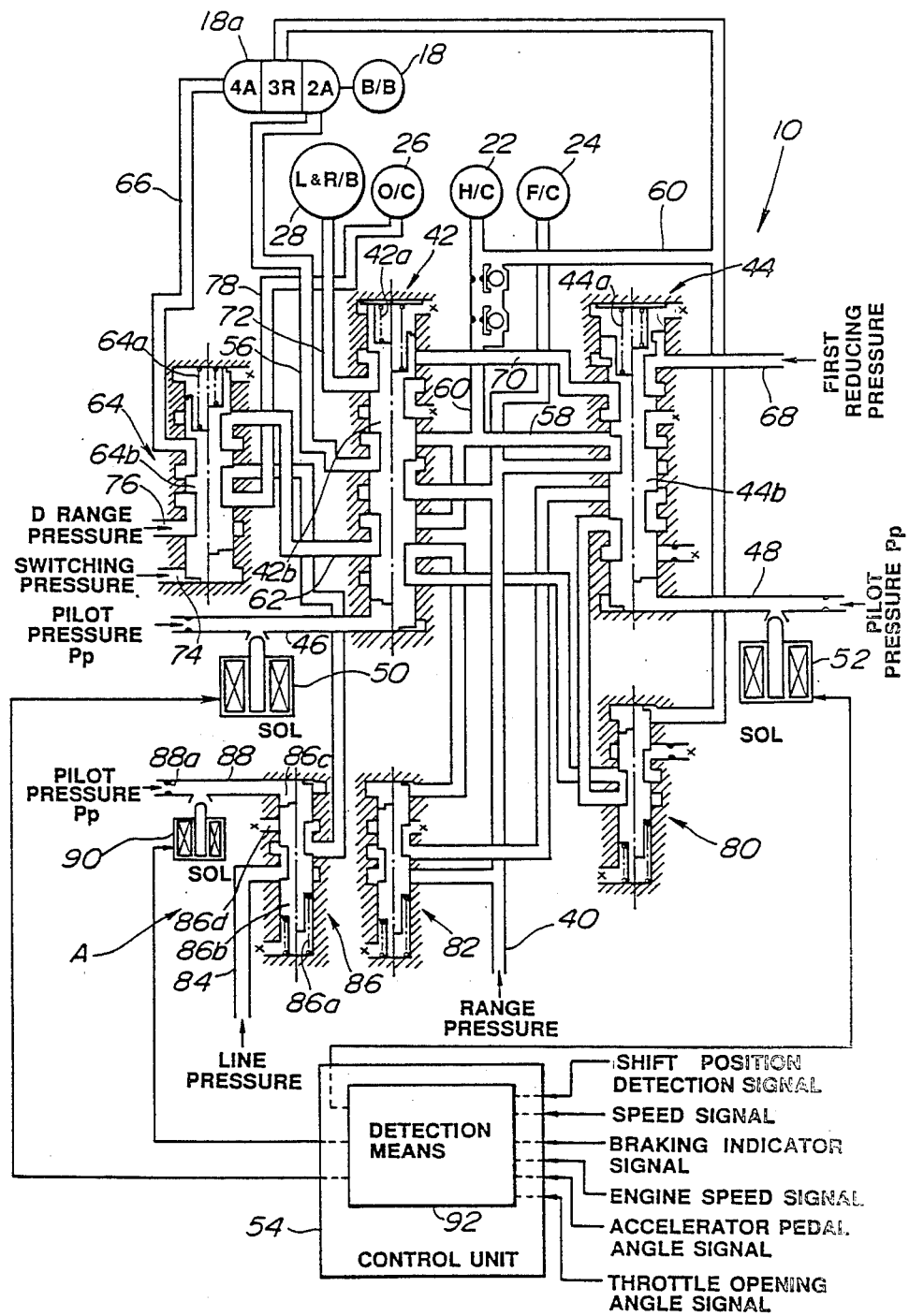
FIG. 1 is a constructional view illustrating an essential part of a transmission control system for automotive vehicles of the embodiment in accordance with the present invention.
Figure 2:
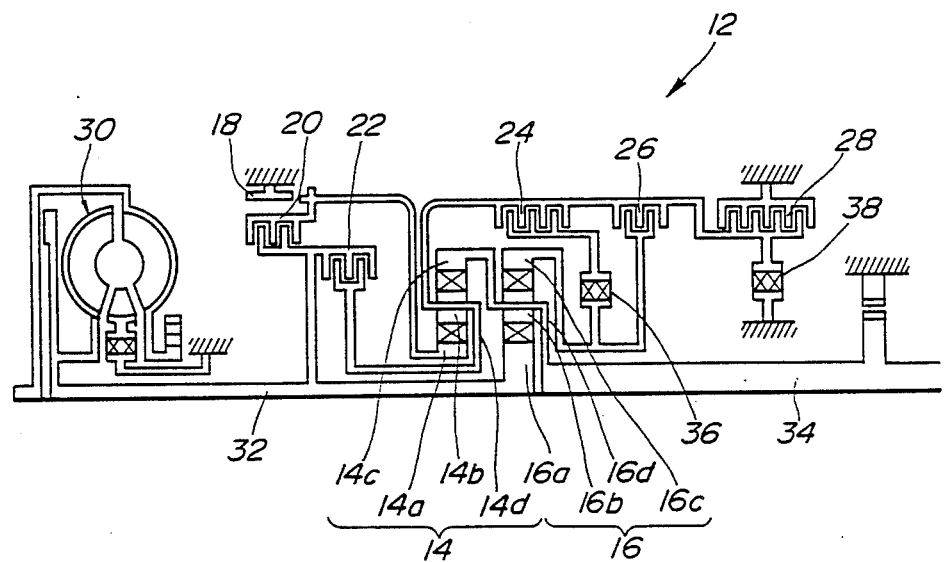
FIG. 2 is a constructional view illustrating an essential part of a gear train of the embodiment according to the invention.

Referring now to the drawings, particularly to FIGS. 1 and 2, a transmission control system 10 is used as a gear change system for a gear train 12 as shown in FIG. 2. The gear train 12 includes a front planetary gear 14 and a rear planetary gear 16. The front planetary gear 14 comprises of a front sun gear 14a, a front pinion gear 14b, a front internal gear 14c, and a front planet pinion carrier 14d. On the other hand, the rear planetary gear 16 comprises of a rear sun gear 16a, a rear pinion gear 16b, a rear internal gear 16c, and a rear planet pinion carrier 16d. As shown in FIG. 2, each element of the two sets of planetary gears 14 and 16 is coupled to the others by frictional elements, such as a band brake (B/B) 18, a reverse clutch (R/C) 20, high-clutch (H/C) 22, a forward clutch (F/C) 24, an overrunning clutch (O/C) 26, and a low and reverse brake (L&R/B) 28. These frictional elements are respectively operated by hydraulic pressure from a control valve (not shown).

As shown in Table 1, each of the respective frictional elements can be selectively engaged or released so as to adjust the gear ratio between an input shaft 32, coupled with a torque converter 30, and the driving wheels coupled thereto by an output shaft 34.

TABLE 1

| RANGE | | FRICTIONAL ELEMENTS | | | | | |
|---|---|---|---|---|---|---|---|
| | | R/C | H/C | F/C | O/C | B/B | L&R/B |
| P | | | | | | | |
| R | | O | | | | | O |
| N | | | | | | | |
| D | 1st Speed | | | O | S | | |
| | 2nd Speed | | | O | S | O | |
| | 3rd Speed | | O | O | S | | |
| | 4th Speed | | O | O | | O | |
| 2 | 1st Speed | | | O | S | | |
| | 2nd Speed | | | O | S | O | |
| 1 | 1st Speed | | | O | O | | O |
| | 2nd Speed | | | O | O | O | |

In Table 1, O denotes engagement of the respective frictional elements. Unmarked sections correspond to released condition of the frictional elements. S denotes elements which can be operated into engagement only while accelerator opening angle of 1/16 or less.

In FIG. 2, reference numeral 36 denotes a forward one-way clutch (F/O.C) and reference numeral 38 denotes a low one-way clutch (L/O.C). The forward one-way clutch 36 is engaged during acceleration at all forward speeds except the 4th speed. The low one-way clutch 38 is engaged during acceleration at 1st speed of D range or 2 range.

The aforementioned frictional elements are operated by hydraulic pressure from the transmission control system regulated by the control valve (not shown).

As shown in FIG. 1, an oil passage 40 is communicated with a D range port of the manual valve. The D range pressure (line pressure) from the D range port is directly supplied to a forward clutch 24, and also supplied to first and second shift valves 42 and 44, respectively. The first and second shift valves 42 and 44 have spools 42b and 44b each urged downward by springs 42a and 44a, respectively. The spools 42b and 44b are switched so as to move upward or downward by switching pressures supplied through oil passages 46 and 48 to each bottom end of the first and second shift valves 42 and 44. The oil passages 46 and 48 respectively, include shift solenoid valves 50 and 52 each being operated in response to a driving signal from a control unit 54. When the solenoid valves 50 and 52 are operated by the driving signal, that is, the solenoid valves are ON, a pilot pressure Pp which is introduced into the oil passages 46 and 48 functions as the switching pressure for the shift valves 42 and 44, is provided to the shift valves 42 and 44 and as a result, the spools 42b and 44b are moved to the uppermost positions thereof. While the first and second solenoid valves 50 and 52 are OFF, the pilot pressure pp is drained and as a result the spools 42b and 44b are moved to the lowermost position. As shown in Table 2, by the combination of the upper and lower positions of the spools 42b and 44b, are controlled so as to engage or release the frictional elements, namely, the band brake 18, the high-clutch 22, and the low & reverse brake 28. In this manner, shifting is performed by the operation of valves.

In practice, the band brake 18 is engaged or released through a hydraulic band servo 18a comprising a release chamber 3R, a first engage chamber 2A, and a second engage chamber 4A. When pressure is supplied to the first engage chamber 2A, the band brake 18 is engaged. When, under this condition, if pressure is supplied to the releasing chamber 3R, the band brake 18 is released. Subsequently, when pressure is supplied to the engaging chamber 4A, the band brake is engaged again.

TABLE 2

| | 1st Shift Valve | 2nd Shift Valve |
|---|---|---|
| 1st Speed | Upward | Upward |
| 2nd Speed | Downward | Upward |
| 3rd Speed | Downward | Downward |
| 4th Speed | Upward | Downward |

Corresponding to Table 2, the condition of first and second solenoid shift valves 50 and 52 is shown in Table 3.

TABLE 3

| | 1st Solenoid Valve | 2nd Solenoid Valve |
|---|---|---|
| 1st Speed | ON | ON |
| 2nd Speed | OFF | ON |
| 3rd Speed | OFF | OFF |

TABLE 3-continued

|  | 1st Solenoid Valve | 2nd Solenoid Valve |
| --- | --- | --- |
| 4th Speed | ON | OFF |

As seen in Table 2, at a 1st speed, the spools of the first and second shift valves 42 and 44 both are shifted to the upward position which corresponds to the left-half of the spool 42b of the shift valve 42 or the right-half of the spool 44b of the shift valve 44, with the result that the D range pressure from the oil passage 40 is prevented by the first and second shift valves 42 and 44. Therefore, at the 1st speed, the D range pressure is supplied only to the forward clutch 24 and as a result the forward clutch 24 is engaged. The forward clutch 24 is constantly engaged at forward speeds.

Next, at a 2nd speed, the spool 42b of first shift valve 42 are moved in the downward position which corresponds to the right-half of the spool 42b of the shift valve 42, with the result that the D range pressure is supplied through an oil passage 56 to the band brake actuation chamber 2A of the band servo 18a. Thus, the band brake 18 is engaged. Subsequently, at a 3rd speed, the spool 44b of the second shift valve 44 is moved in the downward position the shift valve 44, with the result that the D range pressure is supplied through an oil passage 58 to the first shift valve 42 and further supplied through a branch oil passage 60 branched from the oil passage 58 to the high-clutch 22 and the release chamber 3R of the band servo 18a. Therefore, at the 3rd speed, the high-clutch 22 is engaged and the band brake 18 is released.

Moreover, at a 4th speed, the first shift valve 42 is moved in the upward position which corresponds to the left-half of the spool 42b, the D range pressure is supplied through the oil passage 58 to the oil passage 56 and also supplied to an oil passage 62 communicated with the oil passage 58 and further supplied through a overrunning clutch control valve 64 and an oil passage 66 to the second engaging chamber 4A of the band servo 18a. As a result, the band brake is engaged again.

When a first pressure gained by setting a 1st range pressure from a 1st range port of the control valve, is supplied to an oil passage 68 connected to the second shift valve 44, the spool 44b of the second shift valve 44 is shifted upward by the first pressure and as a result the first pressure is introduced to an oil passage 70 communicated with the first shift valve 42. Under this condition, when the first valve 42 is in the 1st speed mode, that is, the first valve 42 is in the upward position, the first pressure is supplied through an oil passage 72 to the low and reverse brake 28. As a result, the low and reverse brake 28 is engaged.

On the other hand, the overrunning clutch control valve 64 includes a spool 64b urged downward by a spring 64a. The spool 64b is switched so as to move upward or downward by switching pressure provided in the bottom end of the overrunning clutch control valve 64 through an oil passage 74.

When the spool 64b is kept in the upward position which corresponds to the right-half of the connected to an oil passage 66, while the spool 64b is kept in the downward position which corresponds to the left-half of the spool 64b, a D range pressure introducing oil passage 76 is connected to an oil passage 78 communicated with the overrunning clutch 26 with the result that the overrunning clutch 26 is engaged.

In FIG. 1, reference numeral 80 denotes a 4-2 sequence valve which, operates when shifting down from the 4 speed to the 2 speed, to prevent releasing of the pressure in the second engage chamber 4A until the pressures in the high-clutch 22 and the release chamber 3R of the band servo 18a are released. On the other hand, reference numeral 82 denotes a 4-2 relay valve which, operates when shifting down from 4th speed mode, to prevent the transmission from shifting directly from 4th speed mode to 2nd speed mode.

In the preferred embodiment according to the invention, an oil passage 84 for introducing a line pressure (D range pressure) is communicated with the oil passage 78 in the upward position of the spool 64b controlling the operation of the overrunning clutch 26. The oil passage 84 is opened or closed by a switching valve 86. The switching valve 86 includes a spool 86b urged by a spring 86a towards the upward position which corresponds to the right-half of the spool 86b in the drawing. The spool 86b is switched upward or downward by a switching pressure applied through an oil passage 88 of an upper chamber 86c thereof. The oil passage 88 is employed with a solenoid valve 90. When the solenoid valve 90 is ON, a pilot pressure Pp which serves as a switching pressure, is generated at a point upstream of an orifice 88a is introduced to the upper chamber 86c with the result that the spool 86b is moved to the downward position corresponding to the left-half of the spool 86b in the drawing. As a result, the oil passage 84 is connected to the overrunning clutch control valve 64.

While the solenoid valve 90 is OFF, the pilot pressure Pp is released in chamber with the result that the spool 86b is positioned in the upper position corresponding to the right-half of the spool 86b in the drawing. As a result, the oil passage 84 is connected to a drain port 86d.

The solenoid valve 90 is activated in response to a signal So which is provided from a detection means 92 of the control unit 54.

The detection means 92 may receive various signals, such as a shift lever position indication signal $S_1$, braking indicator signal $S_2$, a speed signal angle signal $S_5$ indicative of an angle of accelerator pedal, and/or a throttle opening angle signal $S_6$ indicative of an opening angle of throttle valve. The shift lever position signal $S_1$ is outputted from an inhibitor switch (not shown). The braking detection signal $S_2$ is indicative of the braking mode of a parking brake (not shown) or a foot brake (not shown). The speed signal $S_3$ is indicative of the speed of the vehicle and is outputted from a speed sensor (not shown). The detection means 92 processes these signals and outputs the signal So when the relationship between the various detected parameters indicate that sudden or possibly dangerous acceleration would occur if transmission were to be put into the drive mode.

In view of the above, signal So is outputted from the detection means 92 under the following conditions:

The signal $S_1$ indicates the shift lever is in a non-driving position, such as a neutral position (N) or a parking position (P);

Next, the signal $S_3$ indicates a speed of "0", that is, the vehicle is stopped; and Furthermore, the signal $S_2$ indicates the brakes of the vehicle is released.

When the aforementioned set conditions are detected, the signal So is outputted from the detection means 92 to the solenoid valves 90, 50, and 52. As a result, the solenoid valves 90 and 50 become ON and the solenoid 52 becomes OFF. As clearly seen in Table 3, under these conditions the overrunning clutch 26 is engaged, and the operation mode on the transmission becomes similar to that in the 4th speed of the D range. In other words, the band brake 18, the high-clutch 22, the forward clutch 24 and the overrunning clutch 26 are ON.

As seen in FIG. 2, at the 4th speed of D range, the band brake, the high-clutch 22, and the forward clutch 24 respectively, are ON. Therefore, torque from the input shaft 32 is transmitted through the high-clutch 22 to the front planet pinion carrier 14d and as a result the front pinion gear 14b is driven and the front internal gear 14c is driven at higher speed than that of the input shaft 32. At this time, the rear sun gear 16a is driven at the speed of the input shaft 32. On the other hand, the rear internal gear 16c is driven at a higher speed in accordance with the rotation of the rear pinion gear. Under these conditions, if the overrunning clutch 26 is engaged in response to the unintended acceleration detection signal So, torque from the input shaft 32 is transmitted from the high-clutch 22 through front planet pinion carrier 14d via the overrunning clutch 26 to the rear internal gear 16c. As a result, the rear internal gear 16c tends to be driven by the torque transmitted from the overrunning clutch 26 at a slower speed than the above higher speed given by torque transmitted from the rear pinion gear 16b. This causes a large difference between the speed of the rear internal gear caused by engagement of the overrunning clutch 26 and the speed of the rear internal gear 16b gained from the rear pinon gear 16b. The operating pressure is greatly increased between the teeth of rear internal gear 16c and the rear pinion gear 16b. As a result, rotation of the rear planet pinion carrier 16d is prevented and torque is not transmitted to the output shaft 34. In this embodiment, a gear train lock means A which serves so as to lock the gear train in response to the detection signal So, includes the switching valve 86, the solenoid valves 90, 50, and 52.

Figure 3:
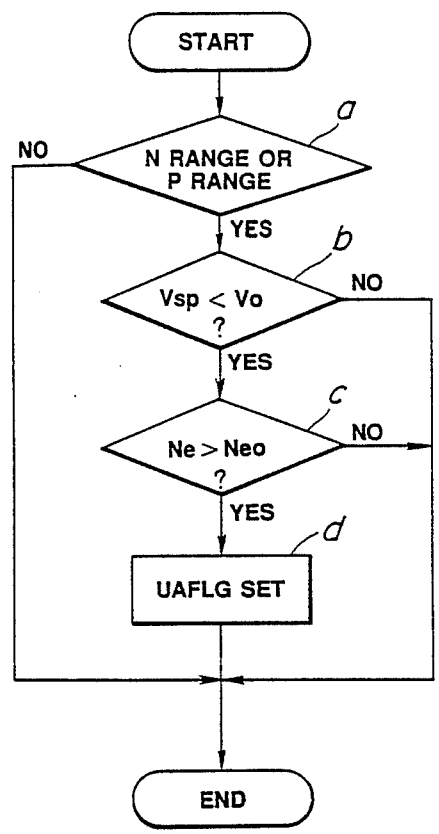
FIG. 3 is a flow chart showing a processing step through which set is a sudden acceleration detection signal representative of an erroneous operation of a driver of the vehicle.

As shown in FIG. 3, the aforementioned detection signal So can be also outputted in accordance with the following steps:

Is the shift lever positioned or not positioned in N range or P range? (Step a);

Is the speed of vehicle Vsp slower than the predetermined speed Vo, for example 5 to 10 km/h? (Step b);

Is the engine speed Ne higher than the predetermined engine speed Neo, for example 2000 r.p.m.? (Step c); and If all these conditions are satisfied, an unintended acceleration flag (UAFLG) is set and the detection signal So is outputted from the detection means 92. (Step d).

While the vehicle is running at a higher speed than the predetermined speed of 5 to 10 km/h, the signal So is not outputted and the gear train is unlocked and operates normally. Similarly, the signal So is not outputted if the foot brake or the parking brake is engaged and the speed Vsp is slower than the predetermined speed Vo and the shift lever is positioned in the N range position or P range position.

Figure 4:
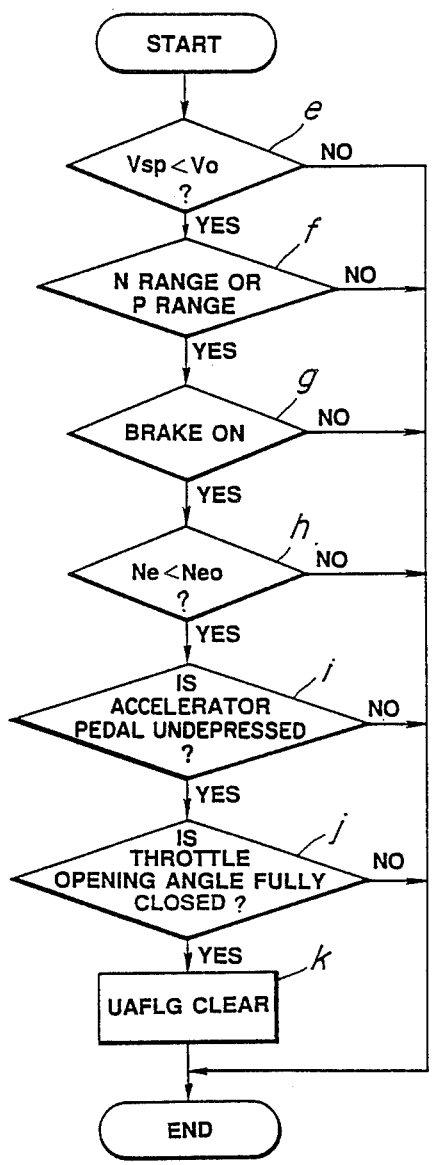
FIG. 4 is a flow chart showing a processing step through which the detection signal is cleared.

As shown in FIG. 4, the gear train 12 locked once, is unlocked in accordance with the following steps:

Is the speed of vehicle Vsp slower than the predetermined speed Vo? (Step e);

Is the shift lever positioned or not positioned in N range or P range? (Step f);

Are brakes applied? (Step g);

Is the engine speed Ne slower than the predetermined engine speed Neo? (Step h);

Is the accelerator pedal undepressed? (Step i);

Is the throttle fully closed? (Step j); and

If all these conditions are satisfied, the unintended acceleration flag (UAFLG) is cleared and the signal So is not outputted. (Step k).

Although the present invention has been disclosed in terms of a transmission control system for vehicular automatic transmission, it is not intended to limit the scope of the invention to such running control systems. The invention may be embodied in other specific forms without departing from the spirit or essential characteristics thereof. Therefore, the invention should be understood in all respects as defined by the appended claims rather than by the foregoing description and all modifications which come within the meaning and range of equivalency of the claims are therefore intended to be embraced therein.

What is claimed is:

1. A transmission control system for an automatic transmission of a vehicle, including a plurality of gears selectively engaged by a plurality of frictional elements in a gear train which are engaged or released by a hydraulic pressure control device characterized by:
    means for monitoring an emergency condition wherein an unintended sudden acceleration of said vehicle occurs when vehicle speed is less than a predetermined value, said monitoring means generating a signal indicate of said emergency condition;
    means for locking said gear train by engaging a predetermined combination of said frictional elements in response to said signal from said monitoring means.

2. A transmission control system as set forth in claim 1, wherein said monitoring means determines said emergency condition by processing a shift lever position signal, a vehicle speed signal, a braking detection signal, and an engine speed signal.

3. A transmission control system as set forth in claim 2, wherein said monitoring means determines said emergency condition by processing an accelerator pedal angle signal and/or a throttle opening angle signal, as well as said shift lever position signal, said vehicle speed signal, said braking detection signal, and said engine speed signal.

4. A transmission control system as set forth in claim 3, wherein said monitoring means outputs said signal indicative of said emergency condition when determining on the basis of said shift lever position signal, said vehicle speed signal, and said engine speed signal that a shift lever is positioned in a neutral position or a parking position, said vehicle speed is less than said predetermined value, and engine speed exceeds a predetermined engine revolution value.

5. A transmission control system as set forth in claim 4, wherein said monitoring means stops outputting said signal indicative of said emergency condition when determining, on the basis of said vehicle speed signal, said shift lever position signal, said braking detection signal, the said engine speed signal, said accelerator pedal angle signal, and said throttle opening angle signal, that said vehicle speed is less than said predetermined value, said shift lever is positioned in a neutral position or a parking position, braking mode is in an ON state, said engine speed is less than said predetermined engine revolution value, an accelerator pedal is unrepressed, and a throttle opening angle is fully closed.

6. A transmission system for an automatic transmission of a vehicle, including a plurality of gears selectively engaged by a plurality of frictional elements in a gear train which are engaged or released by a hydraulic pressure control device, said frictional elements including a forward clutch, a band brake, high-clutch, and an overrunning clutch, characterized by:

means for monitoring an emergency condition wherein an unintended sudden acceleration of said vehicle occurs when vehicle speed is less than a predetermined value, said monitoring means generating a signal indicate of said emergency condition;

means for locking said gear train by engaging a predetermined combination of said frictional elements in response to said signal from said monitoring means;

said locking means comprising:

a first solenoid valve for activating a first spool of a first spool valve which is communicated through oil passage with said plurality of frictional elements;

a second solenoid valve for activating a second spool of a second spool valve which is communicated through said oil passages to said plurality of frictional elements;

a third spool valve hydraulically communicated only with said overrunning clutch, among the plurality of frictional elements, through an oil passage;

a third solenoid valve for activating a third spool of said third spool valve;

said first, second, and third solenoid valves activating said first, second, and third spools, respectively, in response to said signal from said monitoring means in such a manner as to establish engagement of said forward clutch, said band brake, said high-clutch, and said overrunning clutch.

7. A transmission control system as set forth in claim 6, wherein said monitoring means determine said emergency condition by processing a shift lever position signal, a vehicle speed signal, a braking detection signal, and an engine speed signal.

8. A transmission control system as set forth in claim 7, wherein said monitoring means determines said emergency condition by processing an accelerator pedal angle signal and/or a throttle opening angle signal, as well as said shift lever position signal, said vehicle speed signal, said braking detection signal, and said engine speed signal.

9. A transmission control system as set forth in claim 8, wherein said monitoring means outputs said signal indicative of said emergency condition when determining on the basis of said shift lever position signal, said vehicle speed signal, and said engine speed signal that a shift lever is positioned in a neutral position or a parking position, said vehicle speed is less than said predetermined value, and engine speed exceeds a predetermined engine revolution value.

10. A transmission control system as set forth in claim 9, wherein said monitoring means stops outputting said signal indicative of said emergency condition when determining, on the basis of said vehicle speed signal, said shift lever position signal, said braking detection signal, said engine speed signal, said accelerator pedal angle signal, and said throttle opening angle signal, that said vehicle speed is less than said predetermined value, said shift lever is positioned in a neutral position or a parking position, braking mode is in an ON state, said engine speed is less than said predetermined engine revolution value, an accelerator pedal is unrepressed, and a throttle opening angle is fully closed.

* * * * *